(12) United States Patent
Xianghui

(10) Patent No.: US 8,774,555 B2
(45) Date of Patent: Jul. 8, 2014

(54) IMAGE DEFOGGING METHOD AND SYSTEM

(75) Inventor: Bai Xianghui, Shanghai (CN)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 13/606,543

(22) Filed: Sep. 7, 2012

(65) Prior Publication Data

US 2013/0071043 A1    Mar. 21, 2013

(30) Foreign Application Priority Data

Sep. 8, 2011 (CN) .......................... 2011 1 0278747

(51) Int. Cl.
*G06K 9/40*        (2006.01)

(52) U.S. Cl.
USPC ............................................ 382/274

(58) Field of Classification Search
None
See application file for complete search history.

(56) References Cited

U.S. PATENT DOCUMENTS

| | | | |
|---|---|---|---|
| 2011/0188775 A1* | 8/2011 | Sun et al. ....................... | 382/274 |
| 2011/0211758 A1* | 9/2011 | Joshi et al. ..................... | 382/167 |
| 2013/0071043 A1* | 3/2013 | Bai ................................ | 382/255 |

OTHER PUBLICATIONS

He et al "Single Image Haze Removal Using Dark Channel Prior" IEEE transactions on Pattern Analysis and Machine Intelligence Published online Aug. 31, 2010.*
Chen et al "Single Image defogging" Proceedings of IN-NIDC 2009.*
Xie et al "Improved Image Dehazing Using Dark Channel Prior and Multi-scale Retinex" International conference on Intelligent Systems and Design Engineering Application.*
Wang et al "Improved Image Dehasing Using Dark Channel Prior" IEEE 2010.*

* cited by examiner

*Primary Examiner* — Sean Motsinger
(74) *Attorney, Agent, or Firm* — Staas & Halsey LLP

(57) ABSTRACT

Image defogging method and system, the method including: constructing a pixel-based dark channel map of a fogging image; constructing a local area-based dark channel map of the image; acquiring a final dark channel map of the image; acquiring intensity values of R, G, B channels of a pixel having a maximum grey value of all pixels in an area, covered by a brightest area in the local map, in the fogging map, as R, G, B components of an air light value of the image; acquiring a transmission map of the image by using the final map, a maximum value of the components of the air light value, and a defogging parameter; and acquiring intensity values of the channels of pixels in a defogged image by using the transmission map, the air light value, and the intensity values of the R, G, B channels of the pixels in the image.

7 Claims, 2 Drawing Sheets

IMAGE DEFOGGING METHOD AND SYSTEM

CROSS-REFERENCE TO RELATED APPLICATIONS

This application is based upon and claims the benefit of foreign priority of Chinese Application No. 201110278747.X, filed Sep. 8, 2011, the entire contents of which are incorporated herein by reference.

FIELD OF THE INVENTION

The invention relates to image processing, particularly relates to an image defogging method and system.

BACKGROUND OF THE INVENTION

In the case that the weather is bad, the visibility and color of an image are usually degraded by the fog in the atmosphere. It is usually needed to improve the quality of images and videos captured in the weather by defogging. The processing of removing the fog in an image is called image defogging. Image defogging is very useful for navigation and surveillance in the case that the weather is bad.

Currently, there are many image defogging methods, in which an image defogging method based on dark channel prior is a method having the best effect. The dark channel prior is obtained by making statistics on outdoor non-foggy images, i.e. most non-sky local areas in an outdoor non-foggy image have a pixel, the intensity value of at least one color channel of which is very low (usually close to 0). A defogging model established by utilizing the dark channel prior can directly estimate the thickness of the fog, and can restore a fogging image to a high quality image after removing the interference of the fog (called defogged image for short).

In the image defogging method based on dark channel prior, the intensity value J of an input fogging image is solved by using the intensity value I, the air light value A, and the transmission map t of the fogging image. In a traditional image defogging method based on dark channel prior, it is usually needed to optimize the transmission map by soft matting. However, the processing of soft matting needs very complex computation and thus is difficult to implement in real time.

SUMMARY OF THE INVENTION

In view of one or more problems described above, a novel image defogging method and system is provided.

An image defogging method according to an embodiment of the invention comprises: acquiring minimum intensity values of every pixels in a fogging image, and constructing a pixel-based dark channel map of the fogging image by using the acquired minimum intensity values of all pixels; acquiring minimum intensity values of local areas centered on every pixels in the fogging image, and constructing a local area-based dark channel map of the fogging image by using the acquired minimum intensity values of all local areas; acquiring a final dark channel map of the fogging image by using the pixel-based dark channel map and the local area-based dark channel map; acquiring intensity values of R, G, B channels of a pixel having a maximum grey value of all pixels in an area, which is covered by a brightest area of a predetermined size in the local area-based dark channel map, in the fogging image, as R, G, B components of an air light value of the fogging image; acquiring a transmission map of the fogging image by using the final dark channel map, a maximum value of the R, G, B components of the air light value, and a defogging parameter; and acquiring intensity values of R, G, B channels of every pixels in a defogged image by using the transmission map, the air light value, and the intensity values of the R, G. B channels of every pixels in the fogging image.

An image defogging system according to an embodiment of the invention comprises: a pixel-based dark channel map constructing unit for acquiring minimum intensity values of every pixels in a fogging image, and constructing a pixel-based dark channel map of the fogging image by using the acquired minimum intensity values of all pixels; a local area-based dark channel map constructing unit for acquiring minimum intensity values of local areas centered on every pixels in the fogging image, and constructing a local area-based dark channel map of the fogging image by using the acquired minimum intensity values of all local areas; a dark channel map optimizing unit for acquiring a final dark channel map of the fogging image by using the pixel-based dark channel map and the local area-based dark channel map; an air light value acquiring unit for acquiring intensity values of R, G, B channels of a pixel having a maximum grey value of all pixels in an area, which is covered by a brightest area of a predetermined size in the local area-based dark channel map, in the fogging image, as R, G, B components of an air light value of the fogging image; a transmission map acquiring unit for acquiring a transmission map of the fogging image by using the final dark channel map, a maximum value of the R, G, B components of the air light value, and a defogging parameter; and a defogging process implementing unit for acquiring intensity values of R, G, B channels of every pixels in a defogged image by using the transmission map, the air light value, and the intensity values of the R, G. B channels of every pixels in the fogging image.

The invention can perform image defogging on all pixels in the fogging image in parallel by simple computations, and thus can obtain a defogged image, the image quality of which is equivalent to that of a defogged image obtained by a traditional image defogging method based on dark channel prior.

BRIEF DESCRIPTION OF THE DRAWINGS

The invention can be better understood from the following descriptions of the embodiments of the invention in combination with the accompany drawings, wherein.

DETAILED DESCRIPTION OF THE INVENTION

Figure 1:
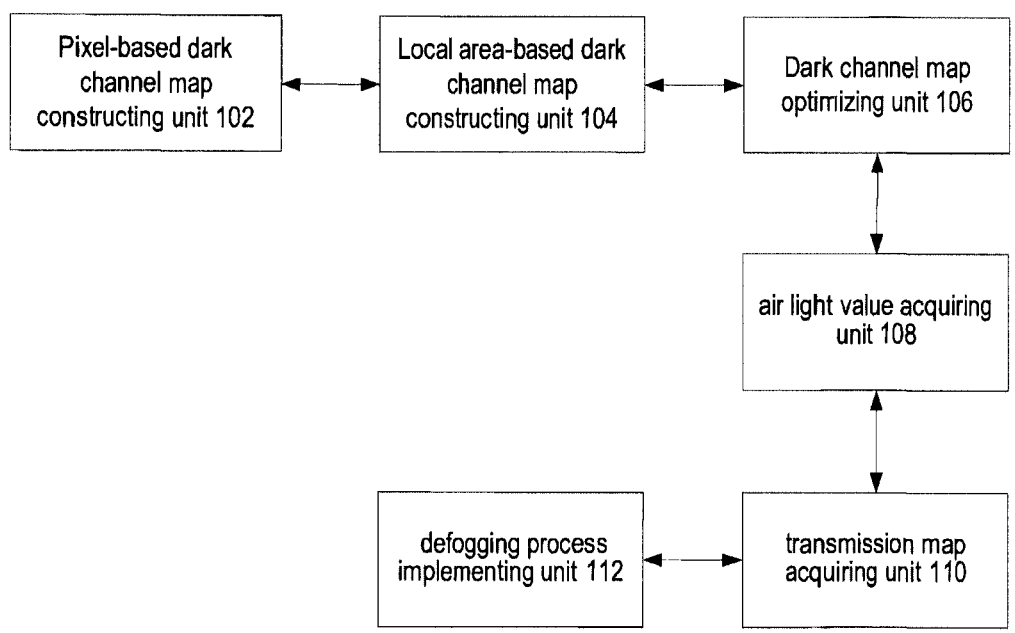
FIG. 1 illustrates a brief block diagram of an image defogging system according to an embodiment of the invention.

Features of respective aspects and example embodiments of the invention will be described in detail below. The following descriptions involve many specific details so as to provide thorough understanding of the invention. However, it is obvious to the person skilled in the art that the invention can be implemented without some of the specific details. The following descriptions of the embodiments are merely for providing clearer understanding of the invention by means of illustrating examples of the invention. The invention is not limited to any specific configuration and algorithm provided below, and covers any modification, alteration and improvement of relevant elements, components and algorithms without going beyond the spirit of the invention.

Below, the traditional image defogging method based on dark channel prior will be firstly described.

Specifically, in the traditional image defogging method based on dark channel prior, the intensity value of a pixel in a defogged image can be solved according to the following fogging image model from the intensity value of a pixel in a fogging image.

$$I(x)=J(x)t(x)+A(1-t(x)) \quad (1)$$

Wherein, I(x) represents the intensity value of any one channel (for example, R channel) of R, G, B channels of a pixel "x" in the fogging image, "A" represents an air light value of the fogging image, t(x) represents a transmission ratio for the pixel "x" in the fogging image and describes an un-scattered part of light in a process that the light is transmitted to a camera lens through a media, and J(x) represents the intensity value of a corresponding channel (for example, R channel) of R, G, B channels of the pixel "x" in the defogged image.

According to the dark channel prior (i.e. most non-sky local areas in an outdoor non-foggy image have a pixel, the intensity value of at least one color channel of which is very low (usually close to 0)), the following equation can be obtained.

$$J^{dark}(x) = \min_{c \in \{r,g,b\}} (\min_{y \in \Omega(x)} (J^c(y))) \quad (2)$$

Wherein, $J^{dark}(x)$ represents a minimum value of the intensity values of R, G, B channels of all pixels in a local area $\Omega(x)$ centered on the pixel "x" in the defogged image (i.e. a dark channel value corresponding to the pixel "x"), $J^c(y)$ represents the intensity value of any one channel of R, G, B channels of a pixel "y" in the local area $\Omega(x)$, and min( ) represents a minimum function. According to the dark channel prior, unless the local area $\Omega(x)$ is a local area in the sky, $J^{dark}(x)$ is close to 0.

The following equation can be obtained by processing the equation (1) by the minimum function:

$$\min_{y \in \Omega(x)} (I^c(y)) = t(x)\min_{y \in \Omega(x)} (J^c(y)) + (1-t(x))A^c \quad (3)$$

Please note that the processing of the equation (3) is performed on R, G, B three color channels, respectively. The following equation can be obtained by transforming the equation (3):

$$\min_{y \in \Omega(x)} \left(\frac{I^c(y)}{A_c}\right) = t(x)\min_{y \in \Omega(x)} \left(\frac{J^c(y)}{A^c}\right) + (1-t(x)) \quad (4)$$

The following function can be obtained by processing the equation (4) by the minimum function:

$$\min_c \left(\min_{y \in \Omega(x)} \left(\frac{I^c(y)}{A_c}\right)\right) = t(x)\min_c \left(\min_{y \in \Omega(x)} \left(\frac{J^c(y)}{A^c}\right)\right) + (1-t(x)) \quad (5)$$

According to the dark channel prior, the dark channel value corresponding to the pixel "x" in the defogged image is close to 0:

$$J^{dark}(x) = \min_{c \in \{r,g,b\}} (\min_{y \in \Omega(x)} (J^c(y))) = 0 \quad (6)$$

As "A" is always positive, $$\min_{c \in \{r,g,b\}} \left(\min_{y \in \Omega(x)} \left(\frac{J^c(y)}{A^c}\right)\right) = 0 \quad (7)$$

The following equation can be obtained by substituting the equation (7) into the equation (5):

$$t(x) = 1 - \min_{c \in \{r,g,b\}} \left(\min_{y \in \Omega(x)} \left(\frac{I^c(y)}{A^c}\right)\right) \quad (8)$$

As can be known from the above descriptions, t(x) can be simply calculated. Next, J(x) can be obtained by the traditional image defogging method based on dark channel prior using the calculated t(x).

The effect of the defogged image obtained by the above processing is good, but the transmission ratio in a local area is not always constant, so the defogged image obtained by the above processing includes block effect although its image quality is substantially good. In the traditional image defogging method based on dark channel prior, the transmission map is optimized by soft matting. Although the optimizing result is good, the processing of soft matting includes complex computations and thus is difficult to implement in real time.

In view of the above problem, the invention attempts to obtain an optimized transmission map by another method to perform image defogging in real time with a simple mode. The quality of the defogged image obtained by the invention is superior or at least equivalent to that of the defogged image obtained by the traditional image defogging method based on dark channel prior.

Figure 2:
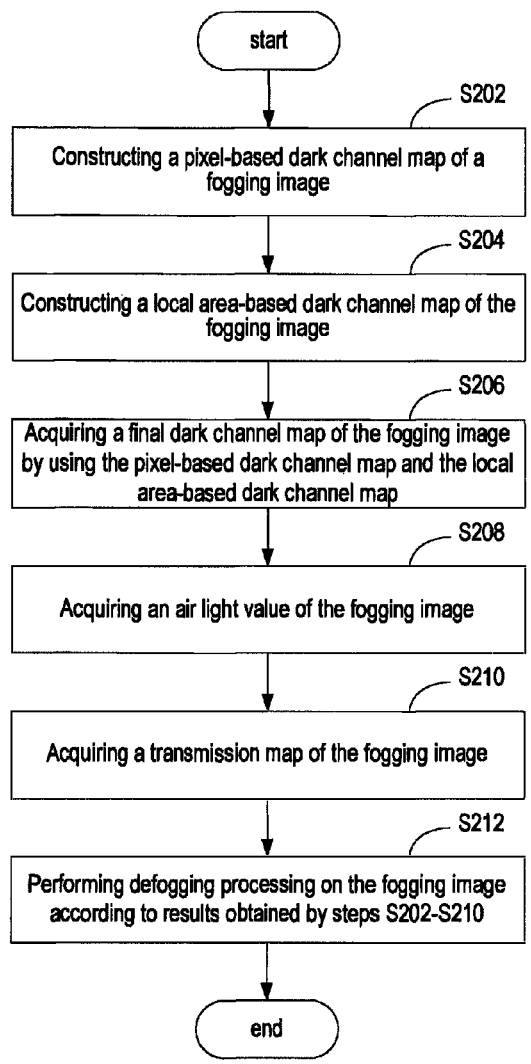
FIG. 2 illustrates a brief flow chart of an image defogging method according to an embodiment of the invention.

FIG. 1 illustrates a brief diagram of an image defogging system according to an embodiment of the invention. FIG. 2 illustrates a brief flow chart of an image defogging method according to an embodiment of the invention. As shown in FIG. 1, the image defogging system according to an embodiment of the invention comprises a pixel-based dark channel map constructing unit 102, a local area-based dark channel map constructing unit 104, a dark channel map optimizing unit 106, an air light value acquiring unit 108, a transmission map acquiring unit 110, and a defogging process implementing unit 112.

The pixel-based dark channel map constructing unit 102 is used for constructing a pixel-based dark channel map of the fogging image (i.e. implementing step S202); the local area-based dark channel map constructing unit 104 is used for constructing a local area-based dark channel map of the fogging image (i.e. implementing step S204); the dark channel map optimizing unit 106 is used for acquiring a final dark channel map of the fogging image by using the pixel-based dark channel map and the local area-based dark channel map (i.e. implementing step S206); the air light value acquiring unit 108 is used for acquiring an air light value of the fogging image (i.e. implementing step S208); the transmission map acquiring unit 110 is used for acquiring a transmission map of the fogging image (i.e. implementing step S210); and the defogging process implementing unit 112 is used for performing defogging processing on the fogging image according to results obtained by the function units 102-110 (i.e. implementing step S212).

Below, the processing of respective steps is described in detail.

S202, the pixel-based dark channel map is constructed. Specifically, minimum values of the intensity values of R, G, B three color channels of every pixels in the fogging image are acquired (i.e. the minimum intensity values of every pixels in the fogging image are acquired) according to the equation (9), and the pixel-based dark channel map of the fogging image is constructed by using the minimum intensity values of all pixels in the fogging image:

$$Dark^p(x) = \min_{c \in \{r,g,b\}} (I(x)) \quad (9)$$

Wherein, $Dark^p(x)$ represents a pixel-based dark channel value corresponding to the pixel "x" in the fogging image, and I(x) represents the intensity value of the pixel "x" in the fogging image.

S204, the local area-based dark channel map is constructed. Specifically, minimum intensity values of the intensity values of R, G, B three color channels of all pixels in local areas centered on every pixels in the fogging image are acquired according to the equation (10) (i.e. the minimum intensity values of the local areas centered on every pixels in the fogging image are acquired), and the local area-based dark channel map of the fogging image is constructed by using the minimum intensity values of the local areas centered on every pixels in the fogging image.

$$Dark^b(x) = \min_{y \in \Omega b(x)} (\min_{c \in \{r,g,b\}} (I(y))) \quad (10)$$

Wherein $Dark^b(x)$ represents a local area-based dark channel value corresponding to the pixel "x" in the fogging image (the local area is a local area) $\Omega b(x)$ centered on the pixel "x" in the fogging image), and I(y) represents the intensity value of the pixel "y" in the local area $\Omega b(x)$ centered on the pixel "x" in the fogging image.

S206, the final dark channel map of the fogging image is acquired by using the pixel-based dark channel map and the local area-based dark channel map. Specifically, an intensity value closest to the intensity value of the pixel "x" in the pixel-based dark channel map is searched in a local block centered on the pixel "x" in the local area-based dark channel map according to the equation (11), and a smaller one of the searched intensity value and the intensity value of the pixel "x" in the pixel-based dark channel map is taken as a final dark channel value corresponding to the pixel "x" in the fogging image. Then, the final dark channel map of the fogging image is constructed by using dark channel values corresponding to all pixels in the fogging image that are obtained by the above processing. It is needed to note that the size of the local area described in step S204 can be the same as or different from that of the local block described in step S206. In the embodiment of the invention, the size of the local block described in step S206 is larger that that of the local area described in step S204 to ensure that edge information can be preserved better.

$$Dark^r(x) = \min_{y \in \Omega b(x)} (\max (Dark^b(y)), Dark^p(x)) \quad (11)$$

Wherein, $Dark^r(x)$ represents the final dark channel value corresponding to the pixel "x" in the fogging image, and max( ) represents a maximum function.

S208, the air light value A of the fogging image is acquired. Specifically, a 0.1% brightest area in the final dark channel map of the fogging image is firstly found out, and then all pixels of an area, which is covered by a brightest area of a predetermined size in the local area-based dark channel map of the fogging image are acquired in the fogging image, and the intensity values of R, G, B channels of a pixel having the largest gray value in the pixels are taken as R, G, B component values of the air light value of the fogging image, respectively.

$$I(A) = \max_{p \in U}(I(P)) \quad (12)$$

$$I(P) = P.r \times 0.2989 + P.g \times 0.587 + P.b \times 0.114$$

Wherein, U represents the area covered by the brightest area in the fogging image, I(P) represents the gray value of any one pixel in the area covered by the brightest area of the predetermined size in the local area-based dark channel map of the fogging image, and I(A) represents the air light value of the fogging image.

S210, the transmission map of the fogging image is acquired. Specifically, the transmission map t(x) of the fogging image is calculated by using the maximum value of R, G, B component values of the air light value A, the final dark channel map, and the defogging parameter ω of the fogging image according to the equation (13).

$$t(x) = 1.0 - \omega \times Dark^r(x)/A_{max} \quad (13)$$

S212, the defogging processing is performed on the fogging image (i.e. the defogged image is reconstructed). Specifically, the intensity values of every pixels "x" in the defogged image are calculated by using the air light value and the transmission map of the fogging image.

$$J(x) = \frac{I(x) - A}{\max(t(x), t_0)} + A \quad (14)$$

Wherein, $t_0$ is a constant, and usually takes "0.1". Specifically, the component value of R channel of the pixel "x" in the defogged image is calculated by using the intensity value of R channel of the pixel "x" in the fogging image, the component value of R channel of the air light value A of the fogging image, and the transmission ratio t(x) of the pixel "x" in the fogging image (or the constant $t_0$) according to the equation (14). The intensity values of G and B channels of the pixel "x" of the defogged image can be calculated by processing similar as the above processing. That is to say, the calculation of the equation (14) is performed with respect to each of the R, G, B channels, respectively.

The invention obtains the final dark channel map of the fogging image by using the pixel-based dark channel map and the local area-based dark channel map, and calculates the transmission map of the fogging image by using the final dark channel map, the air light value and the defogging parameter of the fogging image, and implements image defogging in a relatively simple mode in real time and obtains a defogged image, the quality of which is superior to or at least equivalent to that of the defogged image obtained by the traditional image defogging method based on dark channel prior.

The invention is described above in reference with specific embodiments of the invention. However, the person skilled in the art will appreciate that various modification, combination and alteration can be made to these specific embodiments without departing from the spirit and scope defined by the accompany claims and equivalent thereof.

The steps can be implemented by hardware or software as required. Note, steps can be added to or deleted from the flowchart shown in the specification, and steps in the flowchart can be modified without departing from the scope of the invention. In general, the flowchart is merely used to indicate a possible sequence of basic operations for implementing functions.

The embodiments of the invention can be implemented by using a programmed general digital computer, an application-specific integrated circuit, a programmable logic element, a field-programmable gate array, an optical, chemical, biological, quantum or nano-engineering system, component or infrastructure. In general, functions of the invention can be implemented by any well-known means in the art. Distributed or networked systems, components or circuits can be used. Communication or transmission of data can be wired, wireless, or by any other means.

It will be appreciated that in accordance with requirements of a particular application, one or more of elements shown in the accompany drawings can be implemented in a more discrete or integrated mode, or even be removed or disabled in some cases. Implementing programs or codes that can be stored in a machine-readable medium to allow a computer implement the above method is also within the spirit and scope of the invention.

In addition, any signal arrow in the accompany drawings shall be deemed as exemplary rather than limited, unless otherwise specifically indicated. When a term is predicted to make a capability of separating or combining unclear, the combination of components or steps will be deemed as having been described.

What is claimed is:

1. An image defogging method, comprising:
    acquiring minimum intensity values of every pixel in a fogging image, and constructing a pixel-based dark channel map of the fogging image by using the acquired minimum intensity values of all pixels;
    acquiring minimum intensity values of local areas centered on every pixel in the fogging image, and constructing a local area-based dark channel map of the fogging image by using the acquired minimum intensity values of all local areas;
    acquiring a final dark channel map of the fogging image by using the pixel-based dark channel map and the local area-based dark channel map;
    acquiring intensity values of R, G, B channels of a pixel having a maximum grey value of all pixels in an area, which is covered by a brightest area of a predetermined size in the local area-based dark channel map, in a fogging map, as R, G, B components of an air light value of the fogging image;
    acquiring a transmission map of the fogging image by using the final dark channel map, a maximum value of the R, G, B components of the air light value, and a defogging parameter; and
    acquiring intensity values of R, G, B channels of every pixel in a defogged image by using the transmission map, the air light value, and the intensity values of the R, G, B channels of every pixel in the fogging image.

2. The image defogging method of claim 1, wherein the acquiring of the final dark channel map comprises:
    searching, as for each pixel x in the local area-based dark channel map, for an intensity value closest to the intensity value of the pixel x in the pixel-based dark channel map in a local block centered on the pixel x in the local area-based dark channel map, and taking a smaller one of the searched intensity value and the intensity value of the pixel x in the pixel-based dark channel map as a dark channel value corresponding to the pixel x in the fogging image;
    constructing the final dark channel map by using all dark channel values obtained.

3. The image defogging method of claim 2, wherein a size of the local area is smaller than a size of the local block.

4. An image defogging system, comprising:
    a memory; and
    a processor connected with the memory to:
        acquire minimum intensity values of every pixel in a fogging image, and construct a pixel-based dark channel map of the fogging image by using the acquired minimum intensity values of all pixels;
        acquire minimum intensity values of local areas centered on every pixel in the fogging image, and construct a local area-based dark channel map of the fogging image by using the acquired minimum intensity values of all local areas;
        acquire a final dark channel map of the fogging image by using the pixel-based dark channel map and the local area-based dark channel map;
        acquire intensity values of R, G, B channels of a pixel having a maximum grey value of all pixels in an area, which is covered by a brightest area of a predetermined size in the local area-based dark channel map, in a fogging map, as R, G, B components of an air light value of the fogging image;
        acquire a transmission map of the fogging image by using the final dark channel map, a maximum value of the R, G, B components of the air light value, and a defogging parameter; and
        acquire intensity values of R, G, B channels of every pixel in a defogged image by using the transmission map, the air light value, and the intensity values of the R, G, B channels of every pixel in the fogging image.

5. The image defogging system of claim 4, wherein acquiring of the final dark channel map comprises:
    searching, as for each pixel x in the local area-based dark channel map, for an intensity value closest to the intensity value of the pixel x in the pixel-based dark channel map in a local block centered on the pixel x in the local area-based dark channel map, and taking a smaller one of the searched intensity value and the intensity value of the pixel x in the pixel-based dark channel map as a dark channel value corresponding to the pixel x in the fogging image; and
    constructing the final dark channel map by using all dark channel values obtained.

6. The image defogging system of claim 5, wherein a size of the local area is smaller than a size of the local block.

7. An image defogging method, comprising:
    acquiring a final dark channel map of a fogging image by using a pixel-based dark channel map evaluating minimum intensity values of all pixels in the fogging image and a local area-based dark channel map evaluating minimum intensity values of all local areas of the fogging image;

acquiring intensity values of R, G, B channels of a pixel having a maximum grey value of all pixels in an area, which is covered by a brightest area of a predetermined size in the local area-based dark channel map, in the fogging image, as R, G, B components of an air light value of the fogging image;

acquiring a transmission map of the fogging image by using the final dark channel map, a maximum value of the R, G, B components of the air light value, and a defogging parameter; and acquiring intensity values of R, G, B channels of every pixel in a defogged image by using the transmission map, the air light value, and the intensity values of the R, G, B channels of every pixel in the fogging image.

* * * * *